July 3, 1956 K. T. POTTHOFF ET AL 2,753,058
APPARATUS FOR HANDLING PIPE AND SIMILAR ARTICLES
Filed Sept. 1, 1950 5 Sheets-Sheet 1

Inventors
Kurt T. Potthoff
John Elmstedt
By their attorneys
Howson and Howson.

United States Patent Office 2,753,058
Patented July 3, 1956

2,753,058

APPARATUS FOR HANDLING PIPE AND SIMILAR ARTICLES

Kurt T. Potthoff, Great Neck, and John Elmstedt, Brooklyn, N. Y., assignors to U. S. Galvanizing & Plating Equipment Corporation, Brooklyn, N. Y., a corporation of West Virginia Application September 1, 1950, Serial No. 182,760

8 Claims. (Cl. 214—130)

This invention relates to a machine for automatically taking rods, pipes or similar articles from a hopper and delivering them to a machine or conveyor for further processing, for example to galvanizing and plating machinery. This invention however is not limited to that use but may be employed wherever it is necessary to deliver pipes or similar articles individually, or several of them as a group, from a reservoir or hopper so that they may be taken off for further treatment as desired.

Previous attempts in various industries to provide a machine to feed pipe lengths or other cylindrical articles one or several at a time to a treating or processing machine have met with little success. Their common attempt to feed the articles from the bottom of the hopper has given rise to problems for which no practical satisfactory solution was found.

We have perceived that the problems and difficulties of the prior efforts to make a machine for handling pipe and like articles can be avoided if the articles are fed over the top edge of the hopper.

Therefore it is an object of the invention to provide an improved machine to handle pipe and similar articles by tilting a hopper to distribute the articles therefrom over supporting means.

A related object is to provide a machine of the foregoing type in which the supporting means may be attached to the hopper or is formed as a part thereof, so as to tilt with the hopper.

Among the many other objects of the invention are:

To provide in such a machine means to tilt the hopper about a horizontal axis at a controlled rate and to a predetermined amount;

To provide means to support and spread out the pipe or the like approximately horizontally in a layer diminishing in thickness to the end of the supporting means, as the hopper is tilted;

To provide for control of the inclination of the pipe supporting means by mechanism responsive to the number and location of the pipes on the supporting means;

To provide for step by step or "inching" motion in the final stages of the tilting of the hopper;

To automatically return the hopper to loading position when all its contents have been removed;

To remove the pipes or the like individually, or several in a group, from the supporting means and to place them in a single layer on a suitable secondary support whereon they are held as a reserve and from which they may be removed by conventional automatic means for subsequent processing;

To provide means to control the amount or number of pipes or the like held in the reserve by automatically halting delivery of pipes to the reserve when it contains a predetermined amount and to automatically resume the delivery when the reserve falls below a certain amount;

To coordinate the movements and action of the delivery from the hopper with the delivery to the reserve and its control means;

To provide equalized means to raise and lower the hopper without binding on its axis or twisting of the hopper frame itself;

To provide at various and necessary points in a machine of the foregoing characteristics, adjustments and safeguards as will hereinafter be described;

To utilize in the machine as many individual elements as possible in form available on the market, without materially sacrificing or impairing the functions or the novel features of the new combination.

Other objects and advantages of our invention will appear as it is described in connection with the accompanying drawings.

Figures 1, 2:
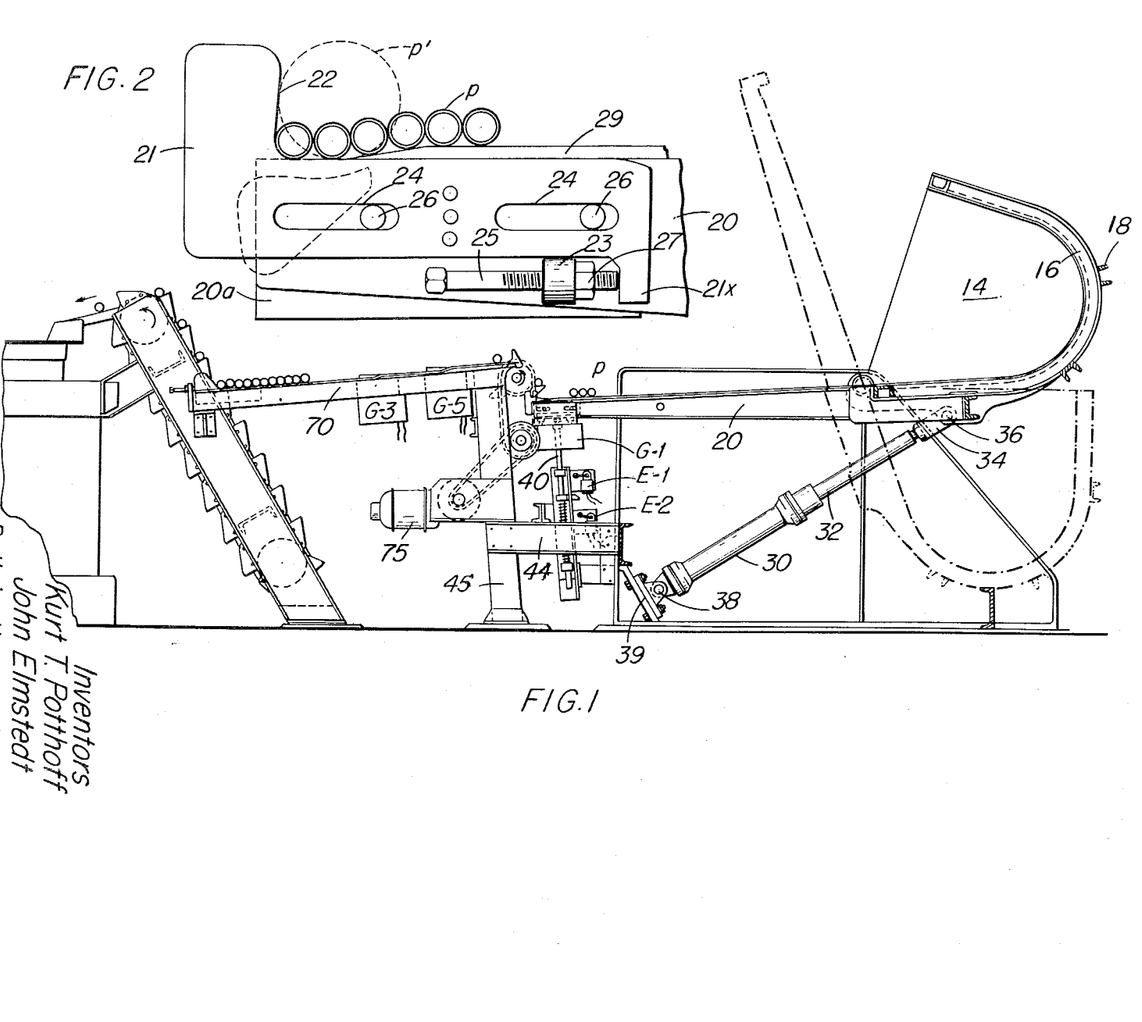
Fig. 1 is a side elevation view of a machine embodying our invention.
Fig. 2 is a fragmentary detail view of the end portion of the hopper rails illustrating the adjustment means thereon.
Figures 3, 4, 5:
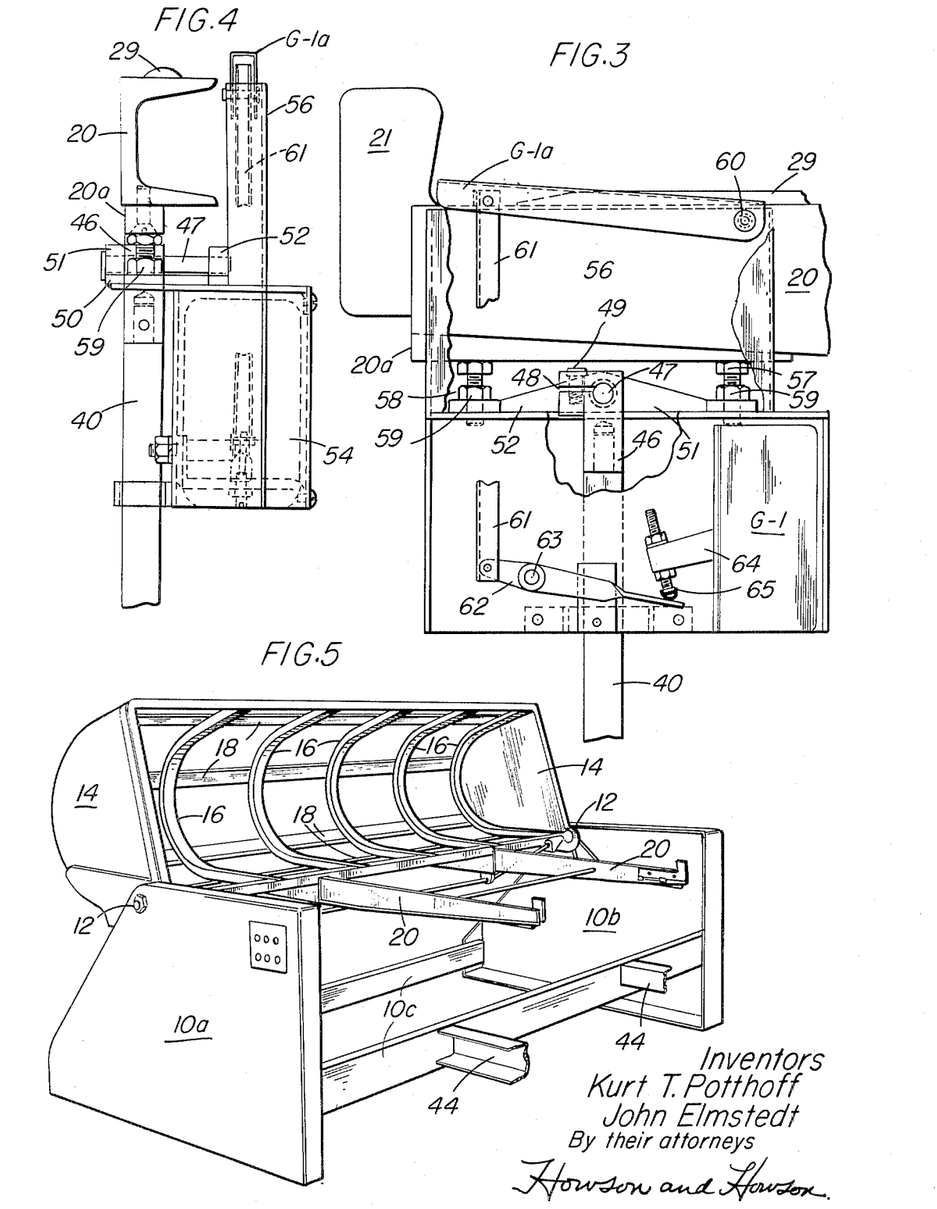
Fig. 3 is a fragmentary detail view partly broken away of the upper portion of the feeler mechanism.
Fig. 4 is an end elevation view of the structure illustrated in Fig. 3.
Fig. 5 is a perspective view of the hopper in discharging position.

Referring to the drawings and particularly to Figs. 1 and 5, a round bottom hopper may be mounted upon stationary framework comprising spaced end plates 10a, 10b, which are connected together by parallel struts 10c at the front and rear edges of the end plates or in any other suitable manner. Upon the framework is mounted the hopper by means of strong coaxial pivot pins 12. The hopper comprises end plates 14 which are parallel to each other and to a series of curved ribs 16 spaced along the length of the hopper. The ribs 16 and end plates are connected together and to each other by a plurality of parallel longitudinally extending braces or channel members 18. Preferably the ribs 16 are substantially straight at their end portions. Extending beyond one side of the hopper as a continuation of the plane of the ends of the ribs 16 are a pair of parallel rails 20 which may be of channel or I beam, or any suitable form. The rails 20 are spaced from each other and symmetrically from the sides of the hopper intermediate its length. The top surfaces of the rails, as a continuation of the side of the hopper, form a supporting surface on which pipes may roll as the hopper is tipped from the broken line to the full line position of Fig. 1.

During loading the hopper is in the broken line position of Fig. 1. Upon the ends of each of the rails 20 is mounted a tip member or plate 21 of substantially L-shape as illustrated in detail in Fig. 2. Their longer leg portions are secured in an adjusted position on the ends of the rails 20 by bolts 26 threaded into the rails and passing through a pair of aligned slots 24 in the tip pieces. The shorter leg extends upwardly at the outer end of the tip plate. To determine the exact position of adjustment relative to the end of the rail, an adjustment bolt 25 passes through a laterally extending lug 23 on the end portion of each rail. The end of the bolt is adapted to abut a downward extension 21X (referring to Fig. 2) from the inner end of the tip plate 21. The exact position of adjustment may be maintained by a lock nut 27 upon the bolt 25.

As will hereinafter more fully appear it is desired not to have the pipes p as they roll down to the ends of the rails engage with the fingers of the feeler switches until the pipes have reached the end and abutted against the upstanding short leg of the end plate. So that the pipes nearest the end of the rails will be at a lower lever than those further away, half round tracks 29 support the pipes p as they roll toward the ends of the rail. (See Figs. 2 and 4.) These half round tracks extend less than the full length of the rails and are tapered at their end portions as illustrated in Fig. 2. Preferably but not necessarily the taper is such that two small pipes p will rest upon the end piece of the rail while those back of those two will rest upon the incline or upon the top surface of the rail and thus be elevated sufficiently not to actuate the feeler switches as hereinafter described.

In a similar manner when a large pipe p' is to be taken off (see Fig. 2) it will rest upon the rails but the pipe next to it will rest upon the track 29 and will not actuate the feeler switches.

In order that the small pipes shall not pile up one on top of another, the surface of the end plates 21 against which the pipes abut in their outermost position is preferably inclined reversely so that if one pipe should tend to roll upon another, it would be turned back by the inclined face 22 of the end plate 21.

In order to move the hopper from loading position into position for discharging, an hydraulic operating mechanism is provided at each end of the hopper comprising hydraulic cylinder 30 in which works a piston on a piston rod 32 whose outer end has a fitting 34 which is pivotally connected by a pin 36 to the side plate of the hopper 14. Since the hydraulic means is identical at each end, only one is illustrated. (See Figs. 1 and 7.) The lower or fixed end of the hydraulic cylinder 30 is pivotally connected with a fixed mounting plate 39 by a pin 38 so that the cylinder may pivot at the bottom as well as at the top as it moves the hopper from one position to another.

An electrically driven pump (not shown except diagrammatically in Fig. 10) of conventional structure is provided to supply fluid under pressure from a reservoir (shown only in the diagram of Fig. 10) to the hydraulic cylinder 30.

Figure 6:
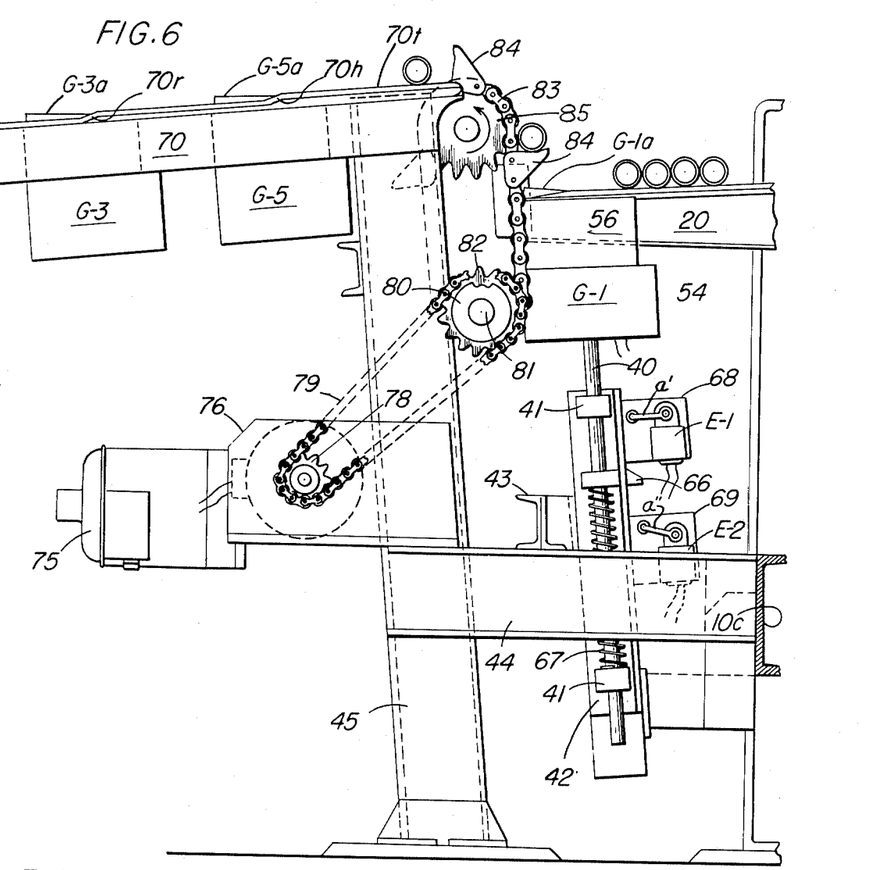
Fig. 6 is an enlarged detail view in side elevation of the feeler mechanism.

As the hopper and its rails 20 move from the loading position to the discharging position, the rails individually abut structure carried by two similar vertical cam rods 40, one at each side of the machine. The precise point of engagement is adjustable as illustrated in Figs. 3, 4 and 6. Since the cam rods and the mechanism carried at their tops are identical, only one is shown in detail and will be described in connection with Figs. 3, 4 and 6. The cam rods are each slidably mounted in a pair of spaced lugs 41 mounted at the upper and lower ends of a vertical angle member 42 which is secured to a horizontal transverse frame beam 43. This beam 43 has its ends mounted on short parallel beams 44 which are located at opposite sides of the machine. Each beam 44 has one end mounted on the longitudinal cross beam 10c of the hopper frame. The other end is connected to a vertical channel member 45 forming a part of the supporting frame work for inclined stationary rails hereinafter to be more fully described. The location of the point of support along the beam 43 at which the angle members 42 are mounted, will depend upon the transverse location in the machine of the rails 20.

Referring now to Figs. 3 and 4 particularly, each cam rod 40 has fixedly mounted upon its upper end in any suitable manner a head member 46. This head member is bored horizontally along a diameter of the rod 40 to receive a pivot pin 47. In order to fixedly secure the pivot pin 10 in position within the head, a slot 48 is cut laterally through an extension of the head preferably in a line parallel to the axis of the pin. In order to narrow the slot and thus to clamp the pin 47 in position, a bolt 49 is provided passing loosely through the top side of the head and taking into a threaded bore on the bottom side of the head. Obviously other suitable means to mount the horizontal pin 47 at the top end of the cam rod 40 may be employed.

Mounted upon the pivot pin 47 is a cradle member comprising a rectangular plate 50, apertured to permit location and movement of the head member 46 within such plate. Parallel bearing bosses 51 and 52 (Fig. 4) are provided upon the plate 50 in spaced positions at opposite sides of the head 46, these bearing bosses being coaxially bored to receive the pivot pin 47 whereby the cradle may loosely pivot about the pin 47.

As previously indicated, as the rails 20 move down into substantially horizontal position, they abut the structure on top of the cam rods 40 in order to cause the cam rods to descend. An abutment plate 20a is preferably provided at the end and on the bottom surface of each rail 20 in position for engagement with the heads 57 of adjustment bolts 58.

Fixedly attached to the cradle and below it and alongside of the cam rod 40 is a housing 54 for a feeler switch and a portion of its operating mechanism. Above and mounted upon the housing 54 is a narrower housing 56 for the feeler finger or operating lever for the feeler switch. Such structure is on the top of each of the cam rods. Hence, description of one will suffice.

The housing 56 is open at its top and has extending therefrom one end of the feeler finger G1a. The feeler finger is preferably a metal member, U-shaped in transverse section, pivoted at one end upon a transverse pivot pin 60 mounted in the end of the housing 56 nearest the hopper. Its other end normally extends at an angle above the upper surface of the housing 56 and in position to be engaged by a pipe which rolls down the tracks of the rail 20. The weight of such pipe will cause the feeler finger to move downwardly into the housing 56. This downward motion is transmitted to the feeler switch, G1, for example, by a thrust rod or member 61 pivotally connected with the free end of the feeler finger G1a. The other or lower end of the thrust rod 61 is pivotally connected within the housing 54 to one end of a lever 62 which is pivotally mounted near its middle upon a fixed pivot pin 63 supported by the housing 54. The opposite end of the lever 62 is adapted to abut an adjustment bolt 65 on the end of switch arm 64 of the switch G1.

The details of the switch G1 are not illustrated and need not be described since it is a conventional switch purchased as a unit upon the market. The switch comprises contacts which are normally biased closed by a spring within the switch housing. Upon movement of the switch lever 64 from its biased position, in which it is shown in Fig. 3, to a point above that position as will occur when the feeler finger G1a is depressed, opening of the normally closed contacts within the switch G1 will occur.

It will be understood that on the cam rod 40 on the other side of the machine there is a switch G2 (illustrated only in the diagram of Fig. 8) identical to the switch G1 and operated by identical operating mechanism through a feeler finger in the same manner as that just described. Thus if a pipe should roll down the rail 20 unevenly with one end resting upon the finger of either the feeler switch G1 or G2, one or the other of those switches will open.

For the purpose of providing adjustment as the rails 20 descend, their abutment plates 20a are adapted to strike the heads of bolts 57, 58 threaded into the cradle 50 at opposite sides of the cam rod 40. These bolts may be fixed in their adjusted position by lock nuts 59.

Mounted upon the cam rod 40 is a cam member 66, the cam 66 being positionable along the rod in any desired position of adjustment by any suitable adjusting means, for example, by slotting the member at one side and binding it upon the cam rod 40 in the desired position by tightening upon a bolt passing through the slotted portions of the cam member.

To normally hold the cam and cam rod in their uppermost position compression spring 67 is coiled about the lower end of the cam rod 40. The lower end of this spring bears upon the bearing lug 41 while the upper end bears against the lower surface of the cam member 66. Mounted upon the vertical angle member 42 is a bracket 68 upon which is mounted an upper limit switch E1. Also mounted upon member 42 is a bracket 69 carrying a lower limit switch E2. When the cam rod 40 is in its uppermost position, the cam 66 will abut against the arm of the switch E1. The details of the structure of the limit switches E1 and E2 are not illustrated except in diagrammatic form in Fig. 8, since these switches may be bought on the open market and therefore their structure need not be specifically described. It will be sufficient to state that each of them is normally biased into one position by a spring and may be moved into another position by engagement of the cam 66 with the switch arms $a'$ or $a''$. Each switch contains a set of contacts which are normally biased closed, indicated on the diagram as E1A for switch E1 and as E2A for switch E2 and another set of contacts which are normally biased open, likewise designated E1B and E2B. Operation of the switch arms against their normal bias will cause opening of the normally closed contacts and simultaneous closing of the normally open contacts.

The foregoing description will enable understanding of the physical structure employed for taking pipes deposited in the hopper and delivering them over one side on to the rails 20 down which they may roll in a layer of diminishing thickness until they abut the end pieces 21. As will hereinafter more fully appear, with the structure above described a single pipe or row of pipes will be available at the end of the rail but at the time the last pipe at the end of the rail is removed, there may be more pipe in the hopper which has not yet rolled down to the end and which will not roll until the hopper is tilted to a greater extent. Thus there would be a delay or entire cessation in feeding the pipe to subsequent processing machinery if the further improvements about to be described were not provided. In order to insure that there shall be no delay or hiatus in the delivery of pipe to the processing machinery, we provide a reserve of pipe placed in order in a layer the thickness of one pipe diameter, which reserve will always be available to be drawn upon by the subsequent processing machinery. The reserve is held upon fixed rails 70 and 71 spaced apart in parallel relation by approximately the same spacing as the rails 20 of the hopper. The fixed rails 70 and 71 are inclined at an angle being supported at one end by the frame members 45 and at a lower level at their other ends by legs 72, 73. The inclination may be in the neighborhood of 5°.

Figure 9:
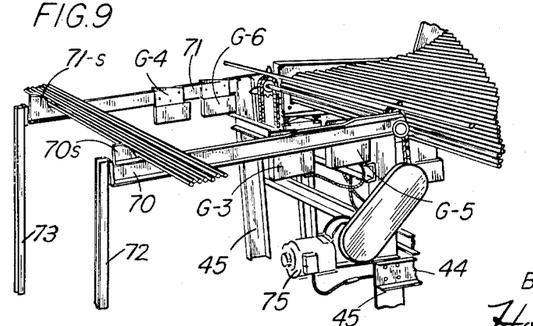
Fig. 9 is a perspective view of the structure for supporting the reserve of pipes and control mechanism associated therewith.

In order to take individual pipe from the hopper rails and deliver them to the fixed rails 70, 71, conveying mechanism is provided being mounted upon the framework adjacent the end of the hopper rails. The conveying mechanism comprises an electric motor 75 mounted upon a bracket plate 76 attached to one of the legs 45. The motor will preferably operate through reduction gearing (not visible) also supported by bracket 76 to rotate a sprocket 78. The sprocket 78 engages with a chain 79 to rotate a sprocket 80. The sprocket 80 is mounted upon an axle 81 journalled in bearings mounted upon the bracket attached to the frame upright 45. Also on the same axle 81 is mounted another sprocket 82 engaged with a conveyor chain 83 passing around an upper sprocket 85 and having mounted thereon at spaced intervals lugs 84 adapted to engage with the pipes as the conveyor chain 83 moves, thus to lift the pipes off the hopper rails 20 and deliver them to the stationary rails 70, 71. Since the stationary rails 70, 71 are inclined away from the point at which the pipes are delivered thereon, they immediately start to roll down toward the opposite end of such rails where they are stopped by fixed stop members 70s, 71s. The axle 81 extends across the machine so as to drive at the other side sprockets similar to 82 and 85 and a conveyor chain 83.

To control the operation of the conveyor motor 75 and thereby to determine the number of pipes held in reserve on rails 70, 71, there are mounted upon the rails 70, 71 conveyor control switches G3, G4, G5 and G6. The structure of these switches G3 to G6 is identical to that of the previously-mentioned feeler switches G1 and G2 except that G3—G6 are biased open. Each of the switches G3 to G6 therefore has an operating finger or feeler lever which is depressed by the weight of a pipe rolling thereover to cause actuation of switch contacts in the manner illustrated and described in connection with Figs. 3 and 4. The switches G3 and G5 are mounted fixedly upon the rail 70. G5 is near the entrance end of the rails and G3 is spaced therefrom at some intermediate point along the rail as may be required by particular usage. The switches G4 and G6 are similarly mounted on rail 71 in equivalent positions to switches G3 and G5 respectively. The location of the switches G3 and G4 along rails 70, 71 will be determined by the minimum number of pipes it is desired to maintain in reserve upon the fixed rails for subsequent removal by usual conveyor mechanism for further processing machinery. If it is desired to have but a few pipes the switches G3 and G4 will be located very near the lower end of the rails, while if it is desired to have a relatively large number of pipes in the reserve, the switches G3 and G4 will be located nearer to switches G5 and G6 at the entrance end of the rails.

Due to the circuit connections as hereinafter more particularly described, the conveyor motor 75 will be stopped when there is a sufficient number of pipes on the rail to come to rest upon the fingers of switches G5 and G6.

We have found it unsatisfactory and undesirable under many conditions for the feeler switches G1 and G2 and for the conveyor control switches G3 to G6 to operate instantaneously to close the circuits controlled thereby. For that reason we have provided time delay switches for delaying circuit controlling action on the circuits ultimately controlled by the action of these feeler switches and conveyor control switches.

It is not deemed necessary to describe in detail the time delay switches or timers since they are elements of the system which may be purchased upon the market and the details of their construction do not per se form a part of our invention.

Figure 8:
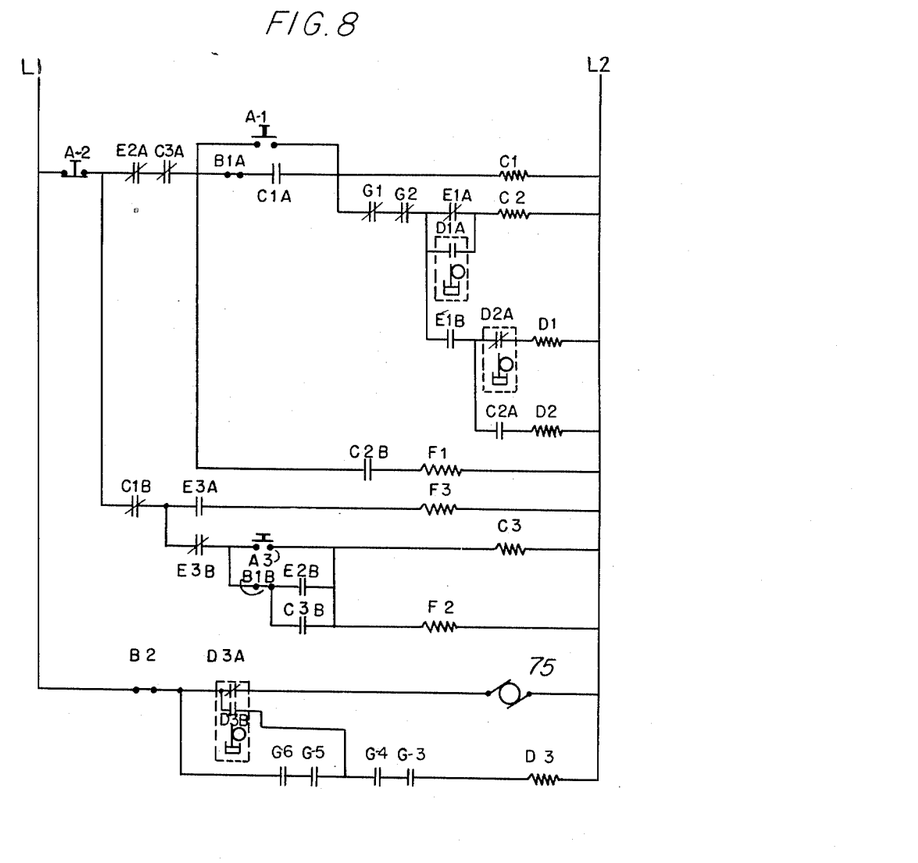
Fig. 8 is a circuit diagram of the electrical connections for the various switches and solenoid operated valves employed in the invention.

One time-delay switch, diagrammatically designated as D–1, associated with the circuits which control lowering of the hopper rails may comprise a set of normally-open contacts. Another time-delay switch D2 also associated with the lowering mechanism may comprise a set of normally-closed contacts. The normally-open contacts D1A close instantaneously when the coil of D1 is energized and the normally-closed contacts D2A of time-delay switch D2 open instantaneously when the coil of D2 is energized. Re-opening of contacts D1A and reclosing of contacts D2A is delayed when the coils of D1 and D2 are deenergized, the delay being by dash pot or electronic means, clock mechanism or any other suitable common delaying means. The timer D3 associated with the conveyor control switches G3, G4, G5, and G6 comprises a set of normally-open and a set of normally-closed contacts D3B and D3A. The closing of D3B and opening of D3A is delayed when coil D3 is energized. All the time switches are self-restoring upon deenergization.

The hydraulic system (see Figs. 7 and 10) for causing operation of the pistons on rod 32 within the hydraulic cylinders 30 and hence the raising and lowering of the hopper comprises the following elements: A tank T containing the hydraulic fluid (usually oil); a pump P connected to the tank for supplying the oil under pressure to the hydraulic system; a solenoid valve 100 operated by solenoids F1 and F2 for controlling flow of the hydraulic fluid into the top or the bottom of the cylinders 30; an equalizing valve 110 controlled by a solenoid F3 to equalize the pressure within the hydraulic cylinders when the hopper is in loading position but remaining closed at other times; a cam operated decelerating valve 120 which is normally biased fully open but may be partially closed when desired to restrict the flow of oil into the top of the cylinders 30; throttle valves 130.

The details of the valves 100, 110, 120 and 130 need not be described since they are all conventional elements which are purchased on the market and their specific structure forms no part of the invention. Therefore they are shown only diagrammatically in Fig. 10.

Figure 10:
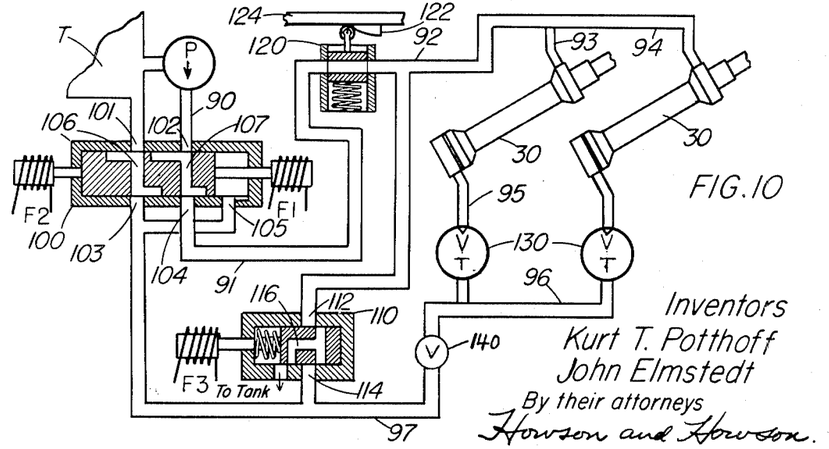
Fig. 10 is a diagrammatic view of the hydraulic system for moving the hopper between loading and discharging positions.

Referring to Fig. 10 the solenoid valve 100 comprises a port 101 connected to the tank T. Another port 102 is connected to the pump P. A third port 104 is connected by a pipe 91 to the deceleration valve 120. The fourth and fifth ports 103, 105 are common and are connected to the bottom ends of the cylinders 30 by a pipe 97 and branch pipes 95 and 96 respectively.

The solenoid valve 100 has a movable piston or slide which can occupy three positions. In the position shown the solenoid F2 is energized and the ports 101, 103 are connected together by a piston passage 106 while ports 102, 104 are connected by a separate piston passage 107. In this position the oil from pump P enters the top of the cylinders 30 to cause lowering of the hopper to loading position. When the solenoid F1 is energized the piston passage 107 then connects ports 102, 105 and the piston passage 106 connects ports 101, 104. In that position oil enters the bottom of the cylinders 30 to cause raising the hopper. In a mid or neutral position wherein neither solenoid is energized, the ports 102 and 103 are not in communication with any of the ports 103, 104, 105 and hence the hydraulic system shuts off from the pump and supply tank. Customarily springs hold and return the valve to neutral when both solenoids are deenergized.

The equalizing valve 110 has ports 112 and 114 connected respectively to the tops and bottoms of the cylinders 30. It is normally biased closed as shown but when its solenoid F3 is energized its piston or slide passage 116 connects together the top and bottom connections of the cylinders 30 and connects them to the tank, whereby the pressure is equalized. This occurs every time the hopper comes into loading position due to operation of limit switch E3 then, as hereinafter more fully appears.

A conventional counterbalance valve 140 may be located in the line 97 (Fig. 10) from the solenoid valve 100 to the bottom of the cylinders 30 to allow free flow when the hopper is moving to discharging position and to retard the flow when the hopper is moving to charging position.

The deceleration valve 120 is provided in the connection between the solenoid valve 100 and the upper ends of the cylinders, the connection being from the valve port 104 through pipe 91 to deceleration valve 120 and thence through pipe 92 to branch pipes 93 and 94 leading to the upper ends of both cylinders 30.

The deceleration valve 120 is normally open as illustrated in Fig. 10, being biased in that position by a spring. It is adapted to be closed by a cam 122 engageable with the stem of the valve to cause partial shutting of the valve 120 and thus reduce the flow therethrough. This closure is caused by movement of a cam rod 124 mounted for sliding movement in bearing members 10m affixed to the side 10a of the machine frame. The cam rod 124 is normally biased by a tension spring 126 into position wherein the cam 122 is out of engagement with the stem of the valve 120, one end of the spring being attached to the cam rod and the other to a pin affixed relative to the machine frame. The cam rod 124 is mounted so as to have one end engageable with a portion of the hopper 14 as the hopper approaches the end of its movement toward loading position, illustrated in Fig. 7. As the hopper reaches that position the cam rod 124 is moved into position illustrated in Fig. 7 wherein the stem of the valve 120 is depressed thus restricting the flow of oil through the valve 120 and into the upper ends of the cylinders 30 and thus slowing down the movement of the hopper. In Fig. 10 the valve parts are shown in the position they occupy during the downward movement of the hopper and before it has reached the position of Fig. 7.

Figure 7:
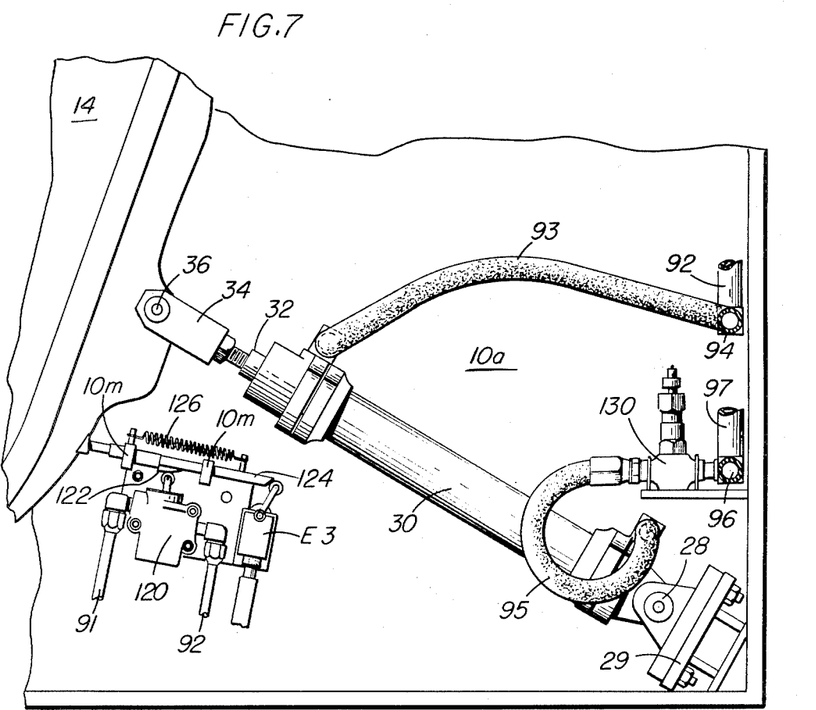
Fig. 7 is a side elevation view of the means for raising and lowering the hopper.

Subsequent to the throttling of the valve 120 by cam 122 the free end of rod 124 strikes and rotates an arm of a limit switch E3. This switch is similar to switches E1 and E2 being spring biased to cause one set of contacts E3A to remain normally open and another set of its contacts E3B to remain normally closed.

In the electric circuit diagrammed in Fig. 8, the manually operated switches and relays are all conventional parts commonly available on the market and hence their details need not be described. The start and stop switches A1 and A2 are spring biased push button devices normally opened and close respectively. The switch B1 is a double pole switch which is normally closed as shown but may be left open if it is desired to "jog" as when adjusting or for preliminary setting. Three electromagnetic relays are provided: One has a coil C1 operating a set of normally open contacts C1A and a set of normally closed contacts C1B; another has a coil C2 operating two sets of normally open contacts C2A, C2B; a third has a set of normally closed contacts C3A and a set of normally open contacts C3B.

With the foregoing in mind the operation may be comprehended.

OPERATION

Referring to the circuit diagram Fig. 8, assume the "on-off" selector switch B2 is closed and that the "jog-run" selector switch contacts B1A, B1B have been closed as is normal when the machine is to be put to use.

Assuming the hopper is in loading position, the limit switch E3 will be in the operated position of Fig. 7 and its normally open contacts E3A will be closed. The solenoid F3 of the equalizing valve 110 will be energized. The circuit is from line L1 through switch A2, normally closed relay contacts C1B, presently closed limit switch contacts E3A, solenoid F3 to line L2.

The conveyor motor 75 is running, the circuit being from line L1 through switch B2, normally closed timer contacts D3A, motor 75 to line L2.

Now, pushing of the start button A1 causes energization of the relay coil C1. The circuit is from line L1 through normally-closed switch A2, normally closed contact E2A, C3A, start switch A1 and coil C1 to line L2. The energization of coil C1 closes its normally open holding contact C1A. Energization of the relay coil C1 also causes the normally closed relay contacts C1B to separate, opening the circuit to equalizing valve solenoid F3 causing the bias of that valve to close it. Opening of contacts C1B also insures maintenance of open circuit to the solenoid F2 for valve 100 which controls the raising and lowering of the hopper.

Pushing of the start button A1 also energizes the coil of relay C2. The circuit may be traced from line L1 through the start button as before and then through normally closed feeler switches G1, G2 and contacts E1A to coil C2 and line L2.

Energization of the coil C2 closes its normally open contact C2A to prepare the circuit for later energization of the coil D2 of the time-delay switch.

Energization of relay C2 also closes its normally open contact C2B which completes the circuit through the solenoid coil F1 of valve 100. As described, this movement of this valve causes oil to operate the piston and tilt the hopper toward discharging position—full line Fig. 1. That lowering continues until the rails 20 are approximately horizontal and the pipes have spread out upon them over the top edge of the hopper in a layer diminishing in thickness toward the ends of the rails. At that point the rails lower the cam rod 40 causing the cam 66 to move down and away from the switch arm of upper limit switch E1.

The inching movement of the hopper

Operation of the upper limit switch E1 causes its normally closed contacts E1A to open, thereby deenergizing the relay coil C2. The deenergization of the relay coil C2 causes its contact C2B to reopen, thus deenergizing the solenoid F1 of the valve 100 which being biased to neutral position thereupon stops the lowering motion of the hopper. However the same operation of the limit switch E1 causes its normally open contacts E1B to close, energizing the coil D1 of the time-delayed switch. The circuit is from line L1 through switches G1 and G2 as previously described and then through contacts E1B, normally closed contact D2A and coil D1 to line L2.

Energization of the coil D1 instantaneously closed its contacts D1A which are connected in shunt around the contact E1A of the upper limit switch, thus completing a circuit to immediately reenergize the relay coil C2. This closes the contact C2B again and reenergizes the coil F1 of solenoid valve 100 to cause the hopper to continue tilting in discharging direction. The reenergization of relay C2 occurs so closely following its deenergization that the action is practically simultaneous, so that the titlting of the hopper is practically continuous.

Upon the reenergization of the relay C2, its normally open contacts C2A again are cloesd but now the contacts E1B of the upper limit switch are in closed condition also. Therefore the coil D2 of the second time delay switch is energized. The circuit may be traced from line L1 through the switches G1, G2 as before and thence through E1B, C2A and coil D2 to line L2. Energization of coil D2 instantaneously opens its normally closed contacts D2A thus deenergizing the coil D1 whose contacts D1A will open at the end of the time delay for which the switch is set. Thereupon the timer D1 is reset. Reopening of contacts D1A deenergizes the relay C2 and the solenoid F1 for valve 100 as previously described. It may thus be seen that the relay C2 remains energized only so long as the D1A contacts remain closed. Since the time delay for which they are set is very short, the hopper rails were only "inched" or tilted slightly further in discharging direction. Opening of D1A contacts with its concomitant deenergizing of C2 coil and reopening of C2A contacts deenergizes coil D2. But contacts D2A are delayed in reclosing. That gives time for pipes to roll down the rails onto the switches G1 and G2, which upon opening will interrupt the "inching." Were the delay of contacts D2A not provided, the inching might continue unnecessarily when the pipes were rolling down the rails toward switches G1, G2.

Assuming that the time delay switches D1 and D2 are set to cause lowering of the hopper rails by about ⅜", if no pipe rolls down on to the switches G1 or G2 (or both) during the first tilting movement, then when contacts D2A finally reclose, the circuit for coil D1 will be reestablished which in the manner just described will cause reenergization of the relay C2 and further downward "inching" movement of the hopper rails. This continues until a pipe rolls down on the feeler switches G1, G2. Thereupon those switches will open, deenergizing the relay coil C2 (C2B opens) and in turn deenergizing the solenoid F1 of valve 100, thus to halt the downward movement of the hopper rails as described.

When all pipes resting upon the switches G1 and G2 have been removed, the circuit will be reestablished through E1B contacts (which remain closed during the "inching" phase) for reenergization of the relay coil C2 to cause further downward inching movement incident to functioning of the time delay switches D1 and D2 as just described. This downward inching movement continues until the cam 66 strikes the arm of lower limit switch E2 to cause its contacts E2A to open. That disables all of the circuits connecting with the timers D1, D2 and the relays C1, C2.

Returning the hopper to loading position

Simultaneously with the opening of the E2A contacts, normally open E2B contacts will close. This will complete branch circuits to energize simultaneously the coil of relay C3 and the solenoid F2 of valve 100. The circuit may be traced from line L1 to stop switch A2, normally closed contacts C1B, normally closed contacts E3B, manually closed contacts B1B of the selector switch, contacts E2B and then branching to relay coil C3 and to solenoid coil F2 to line L2.

Energizing solenoid F2 to operate valve 100 causes that valve to admit oil to the top of the hydraulic cylinders 30 to reverse the movement of the hopper and return it to loading position. At the start of that movement, lower limit switch E2 is released by the rising of cam 66. Hence contacts E2B return to normally open position. This does not disturb existing conditions however for the following reasons: 1st: Relay coil C3 closed its normally open holding contacts C3B (in shunt with E2B). Hence the relay C3 remains energized; 2nd: Energizing of relay coil C3 also opened normally closed contacts C3A. Hence their series circuit with E2A contacts remains open even after E2A re-close.

To slow down the reverse motion of the hopper as it approaches the end of its reverse direction travel, the cam on the push rod acts upon the stem of deceleration valve which restricts the amount of oil entering the hydraulic cylinders 30 to a fraction of the amount previously entering.

Final movement of the hopper to loading position causes the push rod to operate the limit switch E3 causing its normally open contact E3A to close which energizes the solenoid F3 for equalizing valve 110. Simultaneously normally closed contacts E3B open, thus disabling all of the circuit connections to the reversing relay coil C3 and solenoid F2 of valve 100. As coil C3 is deenergized, contacts C3A resume normally closed condition and the circuit is ready for a new cycle.

Control of and maintaining the reserve

The motor 75 which drives the conveyor that takes off pipes which are resting upon switches G1 and G2 at the end of the hopper rails is controlled by normally closed switch D3A in a timer D3. Thus the conveyor motor 75 is normally energized and the conveyor is moving when the machine is in use. As pipes are taken off by the conveyor and delivered to the stationary rails 70, 71, to provide the reserve to be drawn upon by the subsequent processing machinery, they roll down the stationary rails and accumulate. Their accumulation finally actuates switches G3 and G4 by the weight of pipes resting upon their operating fingers. The actuation of both switches G3 and G4 will close those switches but will not complete a circuit. More pipes must accumulate on the stationary rails to actuate and close the normally open switches G5 and G6 which are in series with each other and with switches G3 and G4 as well as with the timer D3. Upon closing of the switches G5 and G6 the timer coil D3 is energized, the circuit from the line L1 will be established through the manually closed switch contacts B2 and thence through the switches G6, G5, G4, G3 and timer coil D3 to line L2. Since the time switch D3 is of the type in which the retarding means causes a delay between energization of the coil and actuation of the contacts, the normally-closed contacts D3A will open and the normally open contacts D3B each will close at the interval after energization of the coil, according to the setting. Opening of contacts D3A will deenergize the conveyor motor 75 so that no more pipes will be delivered to the stationary rails 70, 71. The delay in stopping the conveyor motor 75 enables the reservoir of pipes to be accumulated on rails 70, above or ahead of switches G5 and G6.

Simultaneous with opening of D3A contacts, normally open contacts D3B will close. These contacts being in shunt with the contacts on switches G5 and G6 will maintain the coil D3 energized after the switches G5 and G6 have opened as when pipes roll off their operating fingers as the reserve of pipes on the stationary rolls is depleted. The keeping of the coil energized holds open the contacts D3A and thus maintains inoperative the conveyor motor. This condition continues until the pipes have rolled off the fingers of switches G3 and G4 as happens upon further depletion of the reserve of pipes on the stationary rails.

When the switches G3 and G4 assume their normally open position, the timer D3 is deenergized and, being self-restoring, returns its contacts D3B to open position and D3A to closed position. The closing of D3A restarts the conveyor motor 75. The pipes will thereupon again be taken from the rails of the hopper and delivered to the stationary rails to replenish the reserve of pipes upon those stationary rails.

The foregoing continues until all of the pipes from the hopper have been removed and taken from the hopper rails and delivered to the stationary rails.

By reason of the delay in action of the timer switch contacts D3A and D3B, pipes rolling over the switches G3 to G6 causing momentary closing thereof will not deenergize or affect the conveyor motor 75. It is only when the pipes rest upon the fingers of all the switches G3–G6 inclusive long enough to cause the timer D3 to time out that stopping of the conveyor motor will occur.

Because of the slight inclination and rigid condition of the rails 70, 71 and the angle formed therewith by the plane of the top of the feeler fingers (G3a and G5a for example), it is desired to minimize or avoid altogether any tendency of a pipe, particularly of small diameter, to lodge at the point of intersection of the plane of the rails' top surface and the plane of the top of the feeler fingers. To accomplish that objective we provide tracks 70t on top of the rails with a rise 70r somewhat less than the height of the feeler fingers above the surface of the tracks, the rise being at about mid-point along the length of the feeler fingers G3a. A similar further rise 70h is formed at about the mid-point of feeler fingers G5a. Thus as the pipes roll down the rail tracks they are given added impetus at points 70r and 70h which are precisely the points where any tendency to stop or be caught would otherwise occur.

A similar result occurs at the point where the track 29 on hopper rails 20 tapers off.

Although we have illustrated a machine adjusted to take off one pipe at a time from the hopper rails, it will be apparent that by adjustments and variation of the size of the conveyor fingers several pipes could be taken as a group. The invention is not limited to handling pipe lengths or similar articles individually.

It will be apparent that the invention is not limited to handling pipes but can be put to many other uses for handling any articles which can be fed over the edge of a hopper and down an incline according to the principle of the invention.

Many modifications will occur to those skilled in the art. Therefore the invention is not limited to the specific form and embodiment described and illustrated.

What we claim is:

1. A machine for handling pipe lengths and like articles, comprising tiltable supporting means carrying a supply of articles, power operated means to cause tilting of said supporting means to move the articles thereon in position for removal therefrom, electrical means controlling said tilting means automatically, said electric control means being responsive to the absence of articles in removal position to cause movement of articles into position for removal, said electrical control means also being responsive to the presence of articles in removal position to halt the tilt increasing movement of the supporting means when articles are in position for removal, and time delay means energized by said electric control means to delay momentarily increase in the tilt of said supporting means.

2. A machine for handling pipe lengths and like articles, comprising tiltable supporting means carrying a supply of articles, power operated means to tilt said supporting means to move the articles thereon in position for removal therefrom, means controlling said tilting means to increase the tilt of said supporting means automatically in response to the absence of articles in removal position to cause movement of articles into position for removal, and means to cause the increase in tilt in a step by step motion including time delay electric means responsive to the presence and absence of articles in and from position for removal, and means to cause said tilt increasing means to halt the tilt increasing movement of said supporting means when articles are in position for removal.

3. A machine for handling pipe lengths and like articles, comprising a tiltable hopper, power operated means to tilt the hopper to discharge articles beyond its side, means to control said tilting means, supporting means upon which said articles discharged from said hopper are spread, and means to halt automatically said tilting means when the hopper is tilted to a predetermined position in discharging direction, means to cause said tilting means to return the hopper to loading position, means to halt the tilting means automatically when the hopper has returned to loading position, and means to decelerate the return movement as the hopper approaches the end of such movement comprising a hydraulic valve operated by movement of the hopper.

4. A machine for handling pipe lengths and like articles, comprising tiltable supporting means carrying a supply of the articles, power operated means to tilt said supporting means to move the articles thereon in position for removal therefrom, means controlling said tilting means to increase the tilt of said supporting means automatically in a step by step motion in response to the absence of articles in removal position, and means to cause said last means to also halt the tilt-increasing movement of the supporting means when articles are in position for removal.

5. A machine for handling pipe lengths and like articles, comprising tiltable supporting means carrying a supply of the articles, power operated means to cause tilting of said supporting means to move the articles thereon in position for removal therefrom, means controlling said tilting means to increase the tilt of said supporting means automatically in response to the absence of articles in removal position, and means to cause said last means to halt the tilt-increasing movement of the supporting means when articles are in position for removal, and means responsive to removal of all articles from said supporting means automatically to return said supporting means to its original position.

6. In a machine for handling pipe lengths and similar articles, a hopper tiltable to discharge articles beyond its side, supporting means on which said articles discharged from said hopper are spread, power operated means to tilt the hopper, means to halt the tilting automatically at a predetermined position of the hopper, means to further tilt the hopper when no article is in a predetermined removal position on said supporting means, said last named means including plural control means caused to operate by different portions of an article whereby articles which are askew on the supporting means and which cause either one of said plural means to operate prevent said further tilting means from functioning.

7. In a machine for handling pipe lengths and similar articles, a hopper tiltable to discharge articles beyond its side, tiltable supporting means on which the articles discharged from the hopper are spread, said supporting means comprising members extending beyond the hopper, power operated tilting means, means to deactivate said tilting means when said supporting means has reached a predetermined position, and means to reactivate the tilting means when no article is in a predetermined removal position on said supporting means, said activating and deactivating means including electric switching devices operated by different end portions of an article on the supporting means, operation of any one of said switching devices preventing reactivation of said tilting means.

8. A machine as claimed in claim 7 having means carrying said switching means which is mounted independent of said supporting means and is inoperable by said articles until said supporting means comes into said predetermined position.

References Cited in the file of this patent

UNITED STATES PATENTS

| Number | Name | Date |
|---|---|---|
| Re. 12,553 | Pates | Nov. 6, 1906 |
| 872,735 | Knutson | Dec. 3, 1907 |
| 1,342,470 | Sturtevant et al. | June 8, 1920 |
| 1,763,812 | Olson | June 17, 1930 |
| 1,799,106 | Laxo | Mar. 31, 1931 |
| 1,818,475 | Gray | Aug. 11, 1931 |
| 1,970,574 | Pelosi | Aug. 21, 1934 |
| 2,122,233 | Dunsheath | June 28, 1938 |
| 2,158,069 | Grover | May 16, 1939 |
| 2,180,601 | Mitchell et al. | Nov. 21, 1939 |
| 2,307,717 | Woodbury | Jan. 5, 1943 |
| 2,319,391 | Davis | May 18, 1943 |
| 2,408,730 | Breslav | Oct. 8, 1946 |
| 2,428,103 | Vergobbi | Sept. 30, 1947 |
| 2,571,576 | Hopkins et al. | Oct. 16, 1951 |
| 2,632,554 | Wilcox | Mar. 24, 1953 |